(12) United States Patent
Tanaka (10) Patent No.: US 8,737,053 B2
(45) Date of Patent: May 27, 2014

(54) ELECTRONIC APPARATUS (75) Inventor: Hirokazu Tanaka, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 270 days.

(21) Appl. No.: 13/075,509

(22) Filed: Mar. 30, 2011

(65) Prior Publication Data

US 2011/0242753 A1 Oct. 6, 2011

(30) Foreign Application Priority Data

Mar. 31, 2010 (JP) ................................. 2010-083429

(51) Int. Cl.
*H05K 5/02* (2006.01)
*G06F 1/32* (2006.01)

(52) U.S. Cl.
CPC .................................... *G06F 1/3221* (2013.01)
USPC .............. 361/679.31; 361/679.3; 361/679.41

(58) Field of Classification Search
CPC ... G06F 1/3221; G06F 1/1616; G06F 1/1632; G06F 1/1656; G06F 1/1658; G06F 1/1679; G06F 1/1681; G06F 1/181; G06F 2200/1631
USPC ............ 361/679.22, 679.31, 679.01, 679.02, 361/679.21, 679.41, 679.3, 679.55; 248/917–924, 125.9, 371, 372.1, 397, 248/133, 130; 16/337, 340; 312/223.1–223.2
See application file for complete search history.

(56) References Cited

U.S. PATENT DOCUMENTS 6,144,549 A * 11/2000 Moss et al. ............... 361/679.22
7,580,254 B2 * 8/2009 Anderson ................ 361/679.41
2003/0155479 A1 * 8/2003 Kishi et al. ..................... 248/551
2005/0249101 A1 * 11/2005 Tokunaga ..................... 369/217

FOREIGN PATENT DOCUMENTS

| CN | 1591639 A | 3/2005 |
|---|---|---|
| JP | 2006-344335 A | 12/2006 |
| JP | 2009-10525 A | 1/2009 |
| JP | 2009-54358 A | 3/2009 |

OTHER PUBLICATIONS

Chinese Office Action with English translation dated Jul. 4, 2013 (fourteen (14) pages).
Japanese Office Action dated Mar. 4, 2014 with English translation (four pages).

* cited by examiner

*Primary Examiner* — Anthony Haughton
*Assistant Examiner* — Ingrid Wright
(74) *Attorney, Agent, or Firm* — Crowell & Moring LLP (57) ABSTRACT

An electronic apparatus includes a case, a movable portion that has a recording medium accommodating portion for accommodating a recording medium and a portable terminal accommodating portion for accommodating a portable terminal, and that is able to be moved to an outside of the case and to be moved to an inside of the case, the portable terminal accommodating portion having a connector to be connected to the portable terminal, and an accessing portion that accesses the recording medium accommodated in the recording medium accommodating portion, and that accesses the portable terminal which is connected to the connector through the connector in a state that the portable terminal is accommodated in the portable terminal accommodating portion. When the movable portion is moved to the inside of the case so as to be housed in the case, the connector is located in the case.

10 Claims, 7 Drawing Sheets

ELECTRONIC APPARATUS

BACKGROUND

The present invention relates to a technique for protecting a connector.

As a connecting device for connecting a portable terminal such as a portable telephone or a portable music player to an external apparatus such as a personal computer or an audio apparatus, for example, a so-called dock is used. A connector for electrically connecting a portable terminal is provided on a dock. The connector is exposed to the outside when the connector is not connected to another connector of an external apparatus. Therefore, there is a possibility that adhesion of dust or the like may cause a short circuit or a failure of electrical connection in the connector.

For example, JP-A-2009-54358 and JP-A-2009-10525 disclose a technique for protecting a connector from dust. JP-A-2009-54358 discloses a technique in which, in the periphery of the opening of a recess portion on which a connector is disposed, a lid member for covering the opening of the recess portion is provided. The opening is covered by the lid member to prevent dust and the like from entering the recess portion, thereby preventing a problem due to dust from being caused in the connector. JP-A-2009-10525 discloses a technique in which a plurality of connectors are provided on a connection tray so as to house unused connectors in an apparatus body, thereby preventing the unused connectors from dust, breakage, and the like.

In JP-A-2009-54358, the lid member is disposed only for the purpose of protecting the connector. Also in JP-A-2009-10525, in order to prevent dust from reaching the unused connectors disposed in the apparatus body of an audio processing apparatus, a shield plate for covering an opening through which the connectors are passed is provided.

As described above, in JP-A-2009-54358 and JP-A-2009-10525, components are provided only for the purpose of protecting the connector(s). Therefore, the number of components is increased, and working and production processes require much labor.

SUMMARY

The invention has been conducted under such circumstances. It is an object of the invention to enable to protect a connector without disposing a member only for the purpose of protecting the connector.

In order to achieve the above object, according to the present invention, there is provided an electronic apparatus, comprising:

a case;

a movable portion that has a recording medium accommodating portion for accommodating a recording medium and a portable terminal accommodating portion for accommodating a portable terminal, and that is able to be moved to an outside of the case and to be moved to an inside of the case, the portable terminal accommodating portion having a connector to be connected to the portable terminal; and an accessing portion that accesses the recording medium accommodated in the recording medium accommodating portion, and that accesses the portable terminal which is connected to the connector through the connector in a state that the portable terminal is accommodated in the portable terminal accommodating portion, wherein when the movable portion is moved to the inside of the case so as to be housed in the case, the connector is located in the case.

Preferably, when the portable terminal is connected to the connector, the movable portion is moved in a direction toward the inside of the case.

Preferably, when the portable terminal is connected to the connector, the movable portion is moved to a predetermined position where the portable terminal is located outside the case, and when the movable portion is moved to the predetermined position, the accessing portion accesses the portable terminal.

Preferably, the connector is arranged on the portable terminal accommodating portion of the movable portion so as to be directed in a connecting direction for connecting the portable terminal, and the connecting direction is different from a direction in which the movable portion is moved to the inside of the case.

According to the present invention, there is also provided an electronic apparatus, comprising:

a case; and a movable portion that covers a mounted member which is provided on the case; and an accessing portion that accesses a recording medium and a portable terminal, wherein a connector to be connected to the portable terminal is provided on the movable portion or a portion of a front surface of the case to be covered by the movable portion; and wherein the movable portion is movable between a state where the movable portion covers the mounted member so as to hide the connector and a state where the mounted member and the connector are exposed to the outside.

Preferably, the mounted member is a tray on which the recording medium is loaded.

Preferably, the mounted member is a button or a switch provided on the portion of the front surface of the case to be covered by the movable portion.

According to the invention, even in a configuration where a member only for the purpose of protecting a connector is not disposed, the connector can be protected.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

(1) Embodiment

Hereinafter, an embodiment of the invention will be described with reference to the drawings.

[Whole Configuration]

Figure 1:
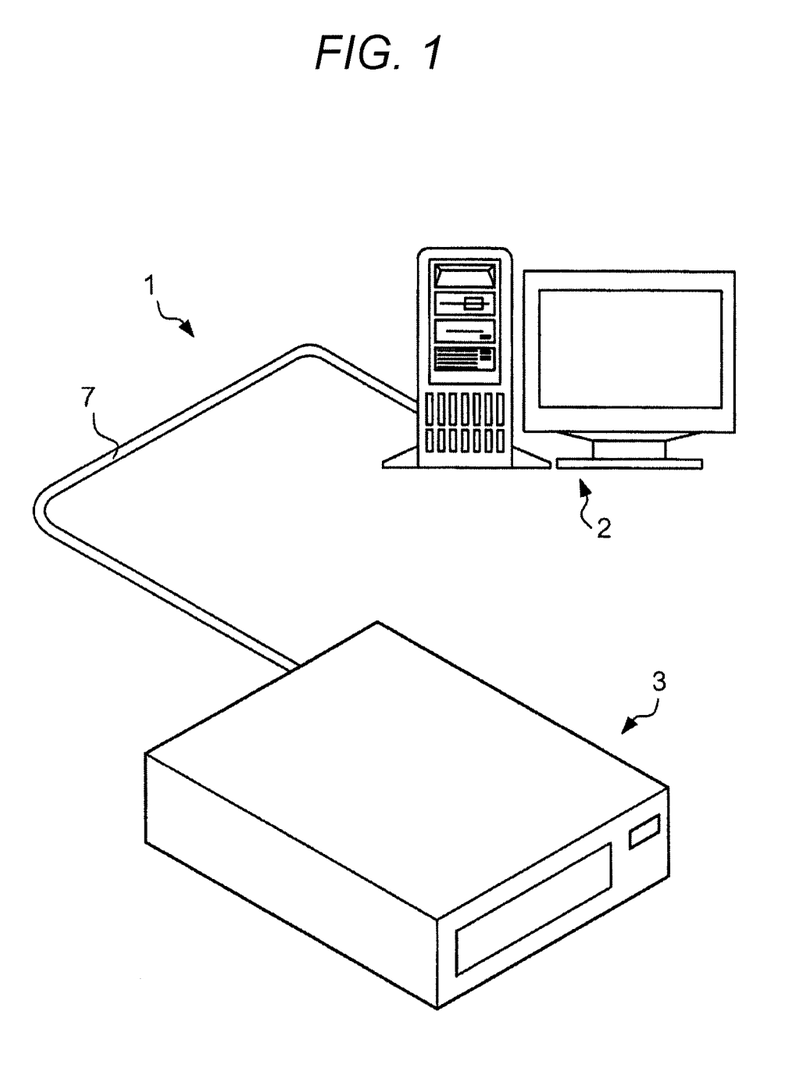
FIG. 1 is a view showing apparatuses constituting an audio system 1.

FIG. 1 is a view showing apparatuses constituting an audio system 1. The audio system 1 includes a computer apparatus 2, an electronic apparatus 3, and a cable 7. The computer apparatus 2 is a so-called personal computer. The electronic apparatus 3 is an auxiliary storage apparatus which can access an optical disc that is an example of a recording medium for storing digital data, i.e., a so-called disc drive. The electronic apparatus 3 can access also a portable music player which includes a nonvolatile memory.

The electronic apparatus 3 includes a connection I/F portion to which the cable 7 is to be connected, and can be connected to the computer apparatus 2 through the cable 7. When the computer apparatus 2 and the electronic apparatus 3 are connected to each other through the cable 7, the computer apparatus 2 can access the optical disc housed in the electronic apparatus 3, so that the computer apparatus 2 can reproduce music data read from the optical disc, or write music data on the optical disc.

In the embodiment, the electronic apparatus 3 is a so-called disc drive. Alternatively, the electronic apparatus may be an optical disc player (for example, a CD player or a DVD player) which is not connected to the computer apparatus 2, and which can alone reproduce an optical disc. In the alternative, the electronic apparatus 3 may include a speaker, and have a configuration where data recorded on an optical disc are reproduced to generate music sound from the speaker, and data recorded in a portable music player are reproduced to generate music sound from the speaker. Furthermore, the electronic apparatus 3 may be built in a computer apparatus as a part of the computer apparatus.

[Configuration of Electronic Apparatus]

Figure 2:
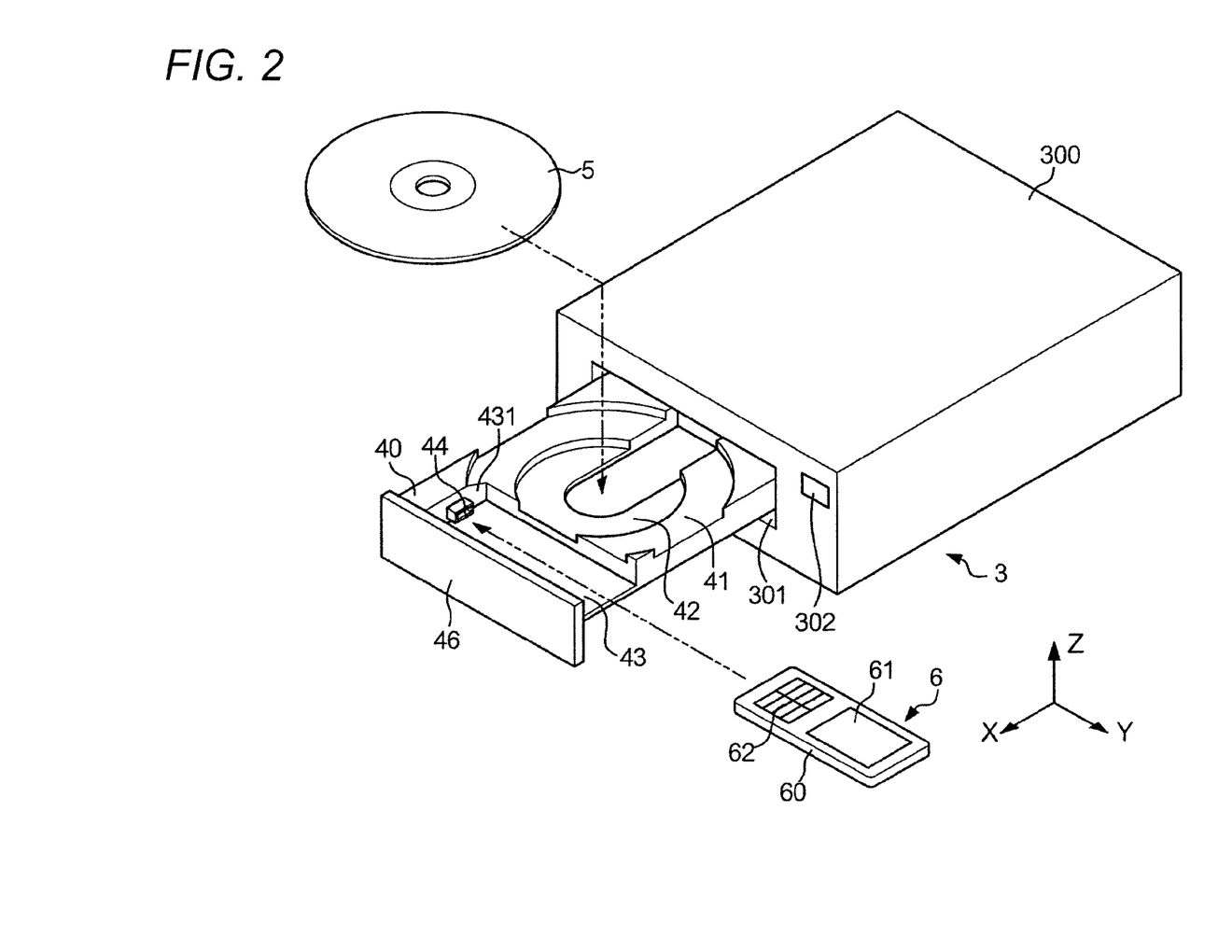
FIG. 2 is a perspective view of a portable terminal 6 which can be connected to an electronic apparatus 3.

FIG. 2 is a perspective view of a portable terminal 6 which can be connected to the electronic apparatus 3. In the following description, an orthogonal coordinate system is assumed in which the front and rear directions as the user views the electronic apparatus 3 in the front are indicated as X-axis directions, the right and left directions are indicated as Y-axis directions, and the upper and lower directions are indicated as Z-axis directions. The positive direction of the X-axis is referred to as the front direction, and the negative direction of the X-axis is referred to as the rear direction. The positive direction of the Y-axis is referred to as the right direction, and the negative direction of the Y-axis is referred to as the left direction. The positive direction of the Z-axis is referred to as the upper direction, and the negative direction of the Z-axis is referred to as the lower direction. In the figures, the symbol in which "•" is written in "○" indicates the arrow which is directed from the rear of the sheet to the front, and that in which "x" is written in "○" indicates the arrow which is directed from the front of the sheet to the rear.

The portable terminal 6 is a portable music player which includes a nonvolatile memory. A case 60 of the portable terminal 6 is formed by, for example, plastic, and has a rectangular parallelepiped shape. The portable terminal 6 has an operating portion 62 including a plurality of operating elements which are to be operated by the user, and a displaying portion 61 including a liquid crystal display device on which an image is to be displayed. The portable terminal 6 further has a female connector (not shown) which is to be connected to another apparatus.

In the case 60 of the portable terminal 6 in the embodiment, the surface (the upper surface in FIG. 2) on which the operating portion 62 and the displaying portion 61 are disposed is referred to as the upper surface, and the opposite surface (the lower surface in FIG. 2) is referred to as the lower surface. In the case 60 of the portable terminal 6, in two side surfaces which are between the upper and lower surfaces, and which are in the ends in the longitudinal direction, the side surface on the side of the operating portion 62 is referred to as the left side surface, and that on the side of the displaying portion 61 is referred to as the right side surface. In the case 60 of the portable terminal 6, in the two side surfaces which are between the upper and lower surfaces, and which are in the ends in the short direction, the surface which is on the side of the positive direction of the X-axis in FIG. 2 is referred to as the front side surface, and that which is on the side of the negative direction of the X-axis is referred to as the rear side surface. The above-described female connector is placed on the left side surface of the case 60 of the portable terminal 6.

In the front surface of the case 300 of the electronic apparatus 3, a rectangular opening portion 301 which communicates with the internal space of the case 300 is disposed. A disc tray 40 is a member on which an optical disc is loaded, and which is movable. In the embodiment, the portable terminal 6 can be connected to the disc tray 40.

A button 302 is disposed in the front surface of the case 300. The button 302 is used for operating the disc tray 40. When the button 302 is operated in a state where the disc tray 40 is projected from the case 300, the disc tray 40 is moved in the rear direction through the opening portion 301 to be drawn into the case 300. When the button 302 is operated in a state where the disc tray 40 is housed in the case 300, the disc tray 40 is moved in the front direction through the opening portion 301 to be projected to the outside of the case 300.

A rectangular plate-like lid 46 is disposed at a front end of the disc tray 40 in the front direction. When the disc tray 40 is housed in the case 300, the lid 46 covers the opening portion 301.

Figure 3A:
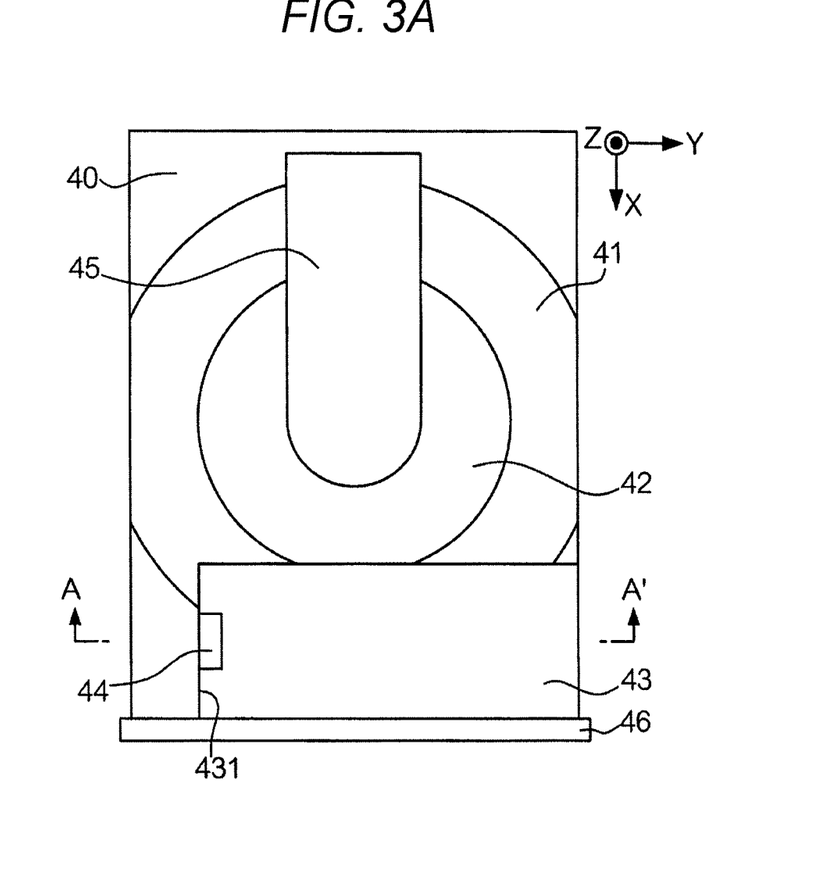
FIGS. 3A and 3B are views showing the structure of a disc tray 40.
Figure 3B:
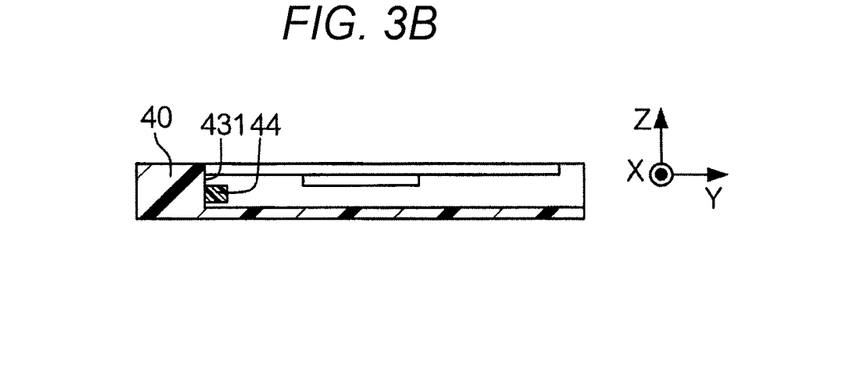

FIGS. 3A and 3B are views showing the structure of the disc tray 40. FIG. 3A is a plan view of the disc tray 40, and FIG. 3B is a sectional view taken along line A-A' in FIG. 3A. A recess 41 and another recess 42 are disposed in the disc tray 40. An optical disc having a diameter of 12 cm is to be accommodated in the recess 41, and an optical disc having a diameter of 8 cm is to be accommodated in the recess 42. Namely, the recess portions 41, 42 correspond to a recording medium accommodating portion for accommodating a recording medium. An opening portion 45 which passes through from the upper side to the lower side in the disc tray 40, and the longitudinal direction of the disc tray 40 coincides with the front and rear directions of the electronic apparatus 3. When the electronic apparatus 3 accesses an optical disc 5, a well-known optical pickup for writing data and reading data from the optical disc 5 is located in the opening portion 45.

A recess portion 43 for accommodating the portable terminal 6 is disposed in the disc tray 40. The recess portion 43 is disposed behind the lid 46, and has a rectangular shape as viewed from the upper side. The depth of the recess portion 43 in the upper and lower directions is larger than the depths of the recess portions 41, 42. The longitudinal direction of the recess portion 43 coincides with the right and left directions of the electronic apparatus 3, and the wall surfaces in the longitudinal direction of the recess portion 43 extend along the right and left directions of the electronic apparatus 3. The left wall surface 431 in the short direction of the recess portion 43 extends in the front and rear directions of the electronic apparatus 3. In the left wall surface 431 of the recess portion 43, a male connector 44 which is to be connected to a portable terminal is placed so as to be projected in the right direction from the left wall surface 431. Namely, the recess portion 43 corresponds to a portable terminal accommodating portion for accommodating a portable terminal. The recess portion 43 has a connector to be connected to the portable terminal.

In the recess portion 43, the user sets the portable terminal 6 to a position which is separated from the connector 44, while directing the left side surface of the portable terminal 6 to the left side, and thereafter moves the portable terminal in the left direction. Then, the connector 44 is fitted into the female connector provided on the left side surface of the portable terminal 6, and the portable terminal 6 and the electronic apparatus 3 are electrically connected to each other. When the connectors are connected to each other, the portable terminal 6 and the computer apparatus 2 can mutually send and receive data through the connectors.

In the embodiment, the electronic apparatus 3 has a function of, when the disc tray 40 is pushed in the rear direction, automatically drawing the disc tray 40 into the case 300. When the operation of connecting the portable terminal 6 to the connector 44 is performed, a force for connecting the connectors to each other is applied from the portable terminal 6 to the disc tray 40. The force is applied in the right and left directions, and not applied in the rear direction. During the operation of connecting the portable terminal 6 to the connector 44, therefore, the disc tray 40 is not drawn into the case 300 by the force applied to the disc tray 40 in the right and left directions. Namely, the direction along which the portable terminal and the connector are connected to each other corresponds to a direction which is different from the movement direction of the movable portion.

Figure 4:
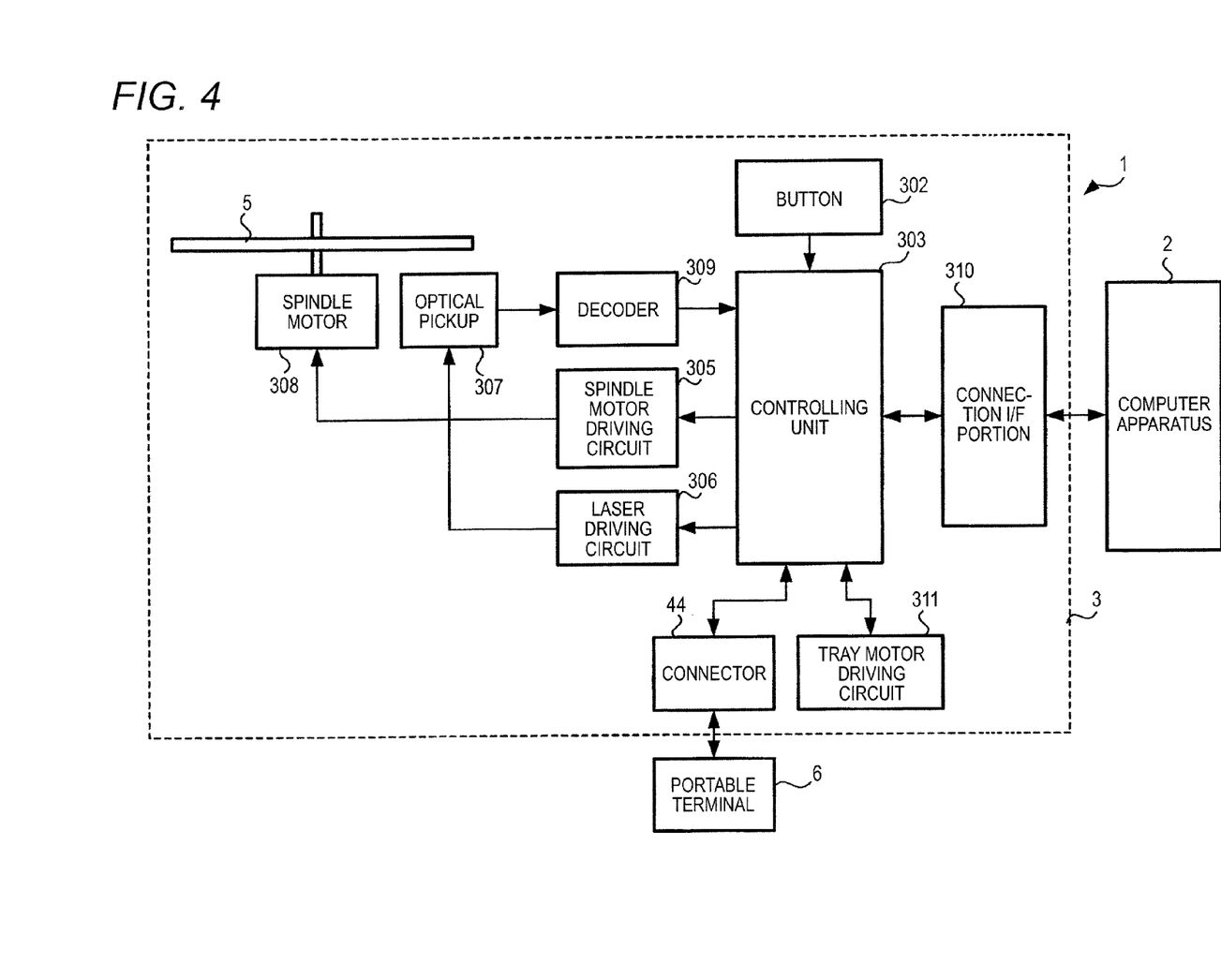
FIG. 4 is a block diagram showing the hardware configuration of the electronic apparatus 3.

Next, the hardware configuration of the electronic apparatus 3 will be described with reference to FIG. 4. FIG. 4 is a block diagram showing the hardware configuration of the electronic apparatus 3. The electronic apparatus 3 has a controlling unit 303 including a CPU (Central Processing Unit), a ROM (Read Only Memory), and a RAM (Random Access Memory). When programs stored in the ROM is performed by the CPU, the controlling unit 303 controls various portions connected to the controlling unit 303. A spindle motor driving circuit 305, a laser driving circuit 306, and a decoder 309 are connected to the controlling unit 303. Furthermore, a tray motor driving circuit 311, the connector 44, the button 302, and the connection I/F portion 310 are connected to the controlling unit 303. The electronic apparatus 3 further has a spindle motor 308 and the optical pickup 307. The controlling unit 303 further has a function of detecting that the portable terminal 6 is connected to the connector 44, and accessing the portable terminal 6. Namely, the controlling unit 303 corresponds to an accessing portion which accesses the portable terminal through the connector.

The connection I/F portion 310 includes the connector to which the cable 7 connecting the computer apparatus 2 to the electronic apparatus 3 is connected, and functions as an interface which transmits and receives data to and from the computer apparatus 2. The spindle motor 308 is a motor for rotating the optical disc 5. The spindle motor driving circuit 305 controls the voltage which is applied to the spindle motor 308 to control the rotational speed of the optical disc 5. The optical pickup 307 has a function of accessing the optical disc 5 while being controlled by the controlling unit 303. Namely, the controlling unit 303 corresponds to an accessing portion which accesses a recording medium accommodated in the recording medium accommodating portion. The laser driving circuit 306 has a function of controlling the laser output value of a laser light source of the optical pickup 307. The optical pickup 307 reads out music data stored on the optical disc 5, and then supplies the read out music data to the decoder 309. The decoder 309 decodes the music data supplied from the optical pickup 307, and supplies the decoded music data to the controlling unit 303. The controlling unit 303 receives the music data supplied from the decoder 309, and can send the music data to the computer apparatus 2 through the connection I/F portion 310.

When the button 302 is operated by the user, a signal indicative of the operation is supplied to the controlling unit 303. The tray motor driving circuit 311 drives a tray motor which operates a mechanism (not shown) for moving the disc tray 40. Under the control of the controlling unit 303, the tray motor driving circuit 311 drives the tray motor. When the button 302 is operated in a state where the portable terminal 6 is not connected to the connector 44 and the disc tray 40 is projected from the case 300, for example, the controlling unit 303 controls the tray motor driving circuit 311 to move the disc tray 40 into the case 300. When the button 302 is operated in a state where the portable terminal 6 is not connected to the connector 44 and the disc tray 40 is housed in the case 300, the controlling unit 303 controls the tray motor driving circuit 311 to move the disc tray 40 to the outside of the case 300. Namely, the disc tray 40 is the movable portion which is able to be moved to the outside of the case and to the inside of the case, and which, when moved to the inside of the case to be housed therein, allows the connector to be located in the case.

Next, the case where the portable terminal 6 is connected to the connector 44 will be described.

Figure 5:
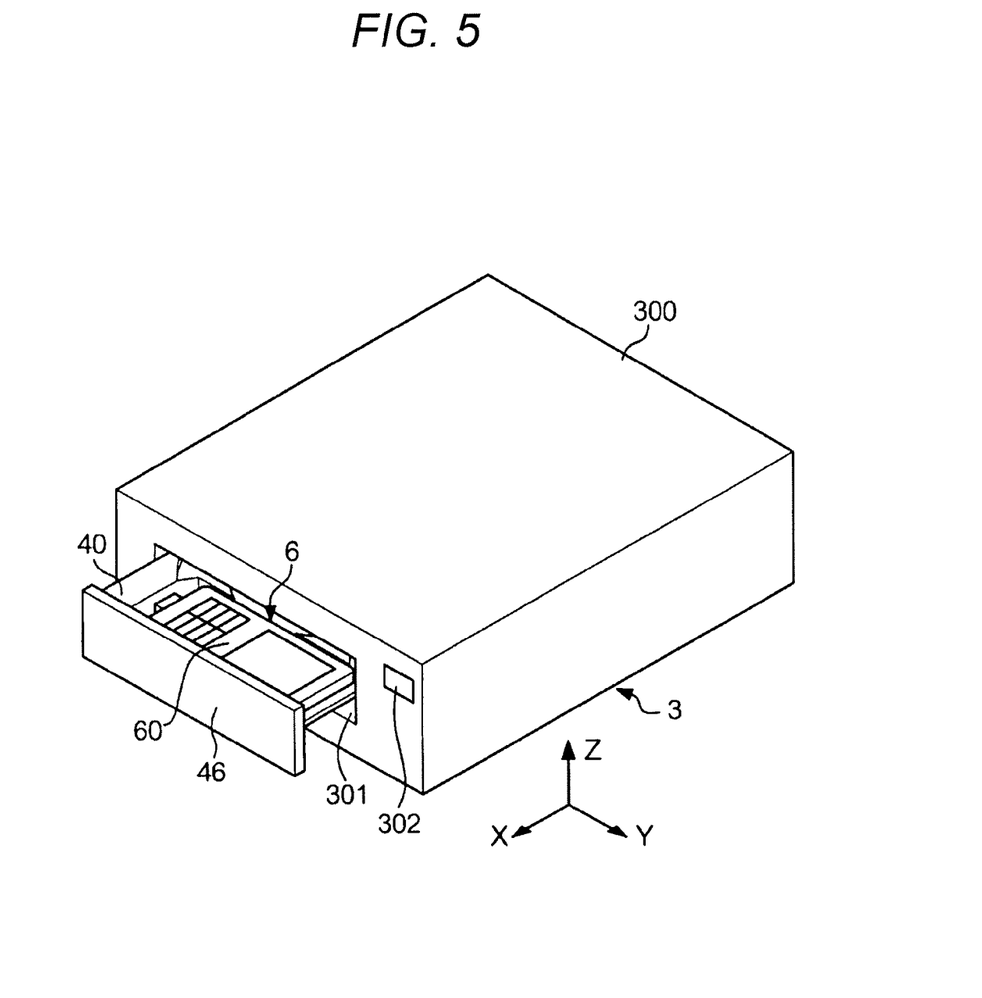
FIG. 5 is a view showing the appearance of the electronic apparatus 3 in a state where the portable terminal 6 is housed.

First, when, in the state where the disc tray 40 is projected from the case 300 as shown in FIG. 2, the portable terminal 6 is accommodated in the recess portion 43 and the female connector of the portable terminal 6 is connected to the connector 44, the controlling unit 303 detects the connection of the portable terminal 6 with the connector 44. When the button 302 is then operated, the controlling unit 303 causes the disc tray 40 to be moved to the inside of the case 300. Here, the controlling unit 303 does not cause the disc tray 40 to be moved until the lid 46 closes the opening portion 301, but causes the disc tray 40 to be moved to a predetermined position so that the portable terminal 6 does not enter the case 300 as shown in FIG. 5. As a result, even in the case where the depth of the recess portion 43 is smaller than the height of the portable terminal 6 extending from the upper surface to the lower surface, i.e., the case where the portable terminal 6 is accommodated in the recess portion 43 while protruding therefrom, the case 60 of the portable terminal 6 does not contact with the case 300 of the electronic apparatus 3. Moreover, the user can recognize the portable terminal 6, and may view the displaying portion 61, and may operate the operating portion 62.

In the case where the button 302 is operated in the state of FIG. 5, the controlling unit 303 causes the disc tray 40 to be moved to the position shown in FIG. 2.

In the embodiment, in the case where the portable terminal 6 is connected to the connector 44, when the disc tray 40 is drawn into the case 300 as shown in FIG. 5 in a manner that the portable terminal 6 can be operated, the controlling unit 303 may enable an access to the portable terminal 6. Moreover, in the case where the portable terminal 6 is connected to the connector 44, when the disc tray 40 is drawn out from the case 300 as shown in FIG. 2, the controlling unit 303 may disable an access to the portable terminal 6. Furthermore, the controlling unit 303 may control the laser driving circuit 306 so as to stop the laser light output from the optical pickup 307, or may control the spindle motor driving circuit 305 so as to stop the rotation of the spindle motor 308.

In the embodiment, in the case where the depth of the recess portion 43 is larger than the height of the portable terminal 6 extending from the upper surface to the lower surface, i.e., the case where the portable terminal 6 does not protrude from the recess 44 and can be accommodated in the recess portion 43, when the disc tray 40 is moved toward the inside of the case 300, the disc tray 40 may not be stopped at the position shown in FIG. 5, but be further moved so that the portable terminal 6 is housed in the case 300 (the disc tray 40 is housed in the case 300).

In the embodiment, when the electronic apparatus 3 is configured so as to include a displaying portion for displaying information such as a liquid crystal display device or a fluorescent display tube, the portable terminal 6 may display information (for example, album names, artist names, and track numbers) related to music data stored in the portable terminal 6 at the timing when the portable terminal 6 is housed in the case 300. Also in the case where the portable terminal 6 is housed in the case 300 as described above, the spindle motor driving circuit 305 may be controlled so as to stop the rotation of the spindle motor 308.

In the embodiment, in the case where the disc tray 40 is housed in the case 300, the connector 44 to which the portable terminal 6 is to be connected is in the case 300, and the lid 46 covers the opening portion 301. Namely, since the opening portion 301 is covered by the lid 46, dust does not enter from the outside to the connector 44 which is disposed in the case 300. Therefore, problems such as a short circuit and a failure of electrical connection can be prevented from occurring in the connector 44. Since the connector 44 provided on the disc tray 40 enters the inside of the case 300, the connector is protected also from being broken by a shock.

In the case where the connector 44 is disposed on the case 300, it is required to make a member for protecting the connector 44 from dust in the case 300 by applying a working process on the case 300, thereby increasing the number of components and causing working and production processes to require much labor. With respect to the appearance of the electronic apparatus 3, in the case where the connector 44 is disposed on the case 300, the connector is conspicuous, and hence the electronic apparatus 3 is defective in design.

By contrast, in the embodiment, the connector 44 is disposed on the disc tray 40 on which the optical disc 5 is to be loaded. Namely, the disc tray 40 can be used not only as a member for loading the optical disc 5 thereon, but also as that for accommodating and connecting the portable terminal 6 thereto. Therefore, the electronic apparatus 3 can be produced without increasing the number of components, and causing working and production processes to require much labor. When the disc tray 40 is housed in the electronic apparatus 3, the connector 44 cannot be seen from the outside. From the viewpoint of the design of the electronic apparatus 3, therefore, the appearance of the electronic apparatus 3 is simple.

(2) Modifications

The invention may be implemented in a manner different from the above-described embodiment. Some or whole of modifications which will be described may be appropriately combined with each other. In the following description, components which are identical with those described in the embodiment or the modifications are denoted by the same reference numerals, and their explanations are omitted.

(2-1) Modification 1

Figure 6:
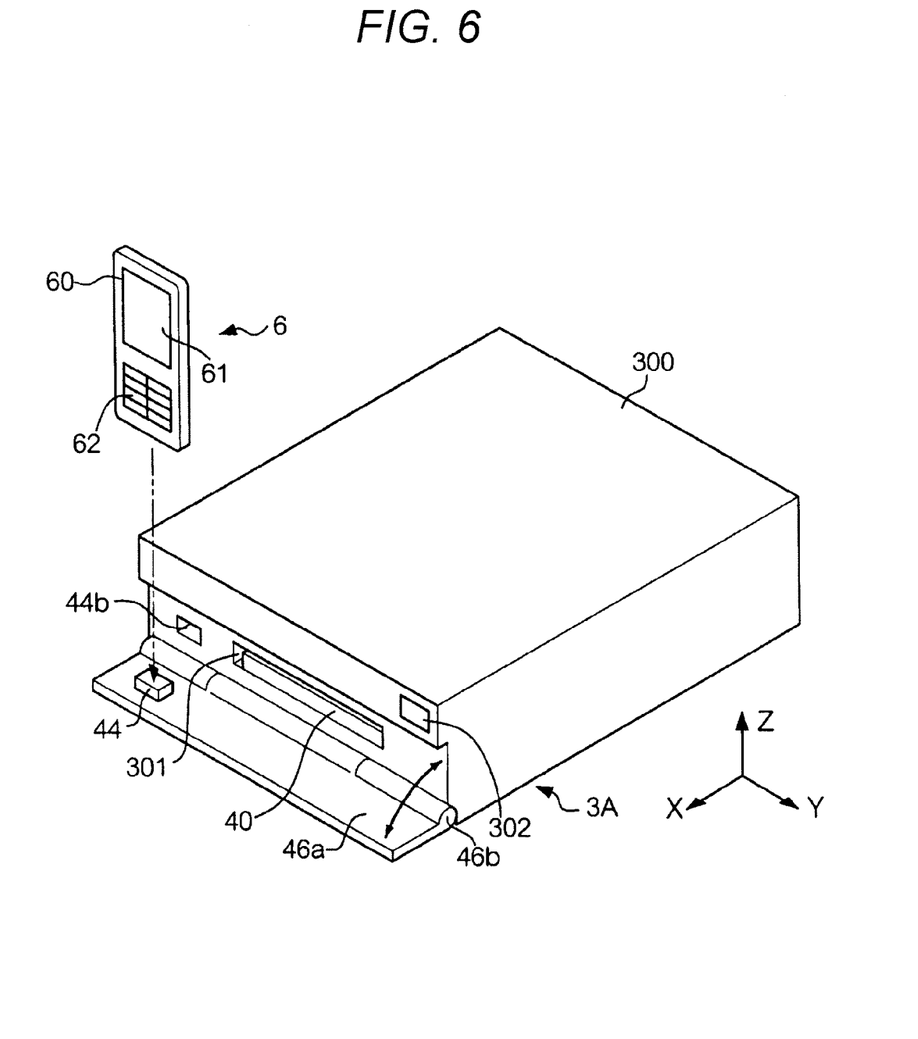
FIG. 6 is a perspective view of an electronic apparatus 3A of a modification.

In the above-described embodiment, the connector 44 is disposed on the disc tray 40. Alternatively, the connector 44 may be disposed on another position. FIG. 6 is a perspective view of an electronic apparatus 3A of a modification. The electronic apparatus 3A has the button 302 which is identical with that of the above-described embodiment. The opening portion 301 is disposed on the front surface of the case 300 of the electronic apparatus 3A. In the same manner as the above-described embodiment, the disc tray 40 is passed through the opening portion 301 to be housed in the case 300.

The electronic apparatus 3A has a rectangular plate-like lid 46*a* for covering the disc tray 40 housed in the case 300 so that the disc tray is invisible. Shafts 46*b* are disposed in the both ends in the longitudinal direction of the lid 46*a*, respectively. The shafts 46*b* are passed through holes disposed in the front sides of the right and left side surfaces of the case 300, respectively. The shafts 46*b* are supported by the holes, so that the lid 46*a* swings about the shafts 46*b* as indicated by the solid-line arrow in FIG. 6. When the lid 46*a* swings to cover and hide the disc tray 40, the opening portion 301 is not exposed to the outside, thereby preventing dust from entering the inside of the case 300. When the lid 46*a* swings in the front direction as shown in FIG. 6, by contrast, the opening portion 301 is exposed to the outside, thereby allowing the disc tray 40 to be moved.

In the lid 46*a*, the connector 44 is provided so as to be projected from the lid 46*a*, on the surface which is upward directed when the lid swings as shown in the front direction in FIG. 6. In the configuration, the portable terminal 6 is provided on the lid 46*a* while the left side surface in which the female connector is fitted is directed toward the connector 44, and, when the connector 44 is fitted to the connector of the portable terminal 6, the portable terminal 6 and the electronic apparatus 3 are electrically connected to each other.

A containing portion 44*b* is disposed on a portion of the front surface of the case 300 which is to be covered by the lid 46*a*. When the lid 46*a* covers and hides the disc tray 40, the connector 44 is fitted into the containing portion 44*b*. Namely, the lid 46*a* is a movable portion which covers a mounted member, for example the disc tray 40, which is provided in the case, and has the connector 44 to be connected to the portable terminal. Also, the lid 46*a* is movable between a state where the lid 46*a* covers the mounted member and a state where the mounted member is exposed to the outside.

Alternatively, the connector 44 may be provided on the portion of the front surface of the case 300 which is to be covered by the lid 46*a*. In this case, the lid 46*a* can cover both of the disc trey 40 and the connector 44. For example, the connector 44 may be provided on a portion of the front surface of the case 300 which is shown in FIG. 6 as the containing portion 44*b*. Also, a containing portion, into which the connector 44 is fitted, may be provided on a portion of the lid 46*a* which is shown in FIG. 6 as the connector 44.

In the modification, in the case where the portable terminal 6 is not connected to the connector 44 and the lid 46*a* covers and hides the disc tray 40, the connector 44 is housed in the containing portion 44*b* and is not exposed to the outside, and hence dust does not reach the connector 44. Therefore, problems such as a short circuit and a failure of electrical connection can be prevented from occurring in the connector 44. Since the connector 44 enters the inside of the case 300, moreover, the connector 44 is protected also from being broken by a shock.

In the modification, the connector 44 is disposed on the lid 46*a* which covers and hides the disc tray 40. In the modification, the lid 46*a* can be used not only as a member for covering the disc tray 40, but also as that for connecting the portable terminal 6. Namely, the electronic apparatus 3 can be produced without increasing the number of components, and causing working and production processes to require much labor.

In the modification, the lid 46a covers the front surface of the disc tray 40 which is the mounted member provided in the case 300. In the configuration of FIG. 6, buttons or switches for operating the electronic apparatus 3 may be disposed in the periphery of the disc tray 40 on the front surface of the case 300, and these mounted members may be covered by the lid 46a.

(2-2) Modification 2

Figure 7A:
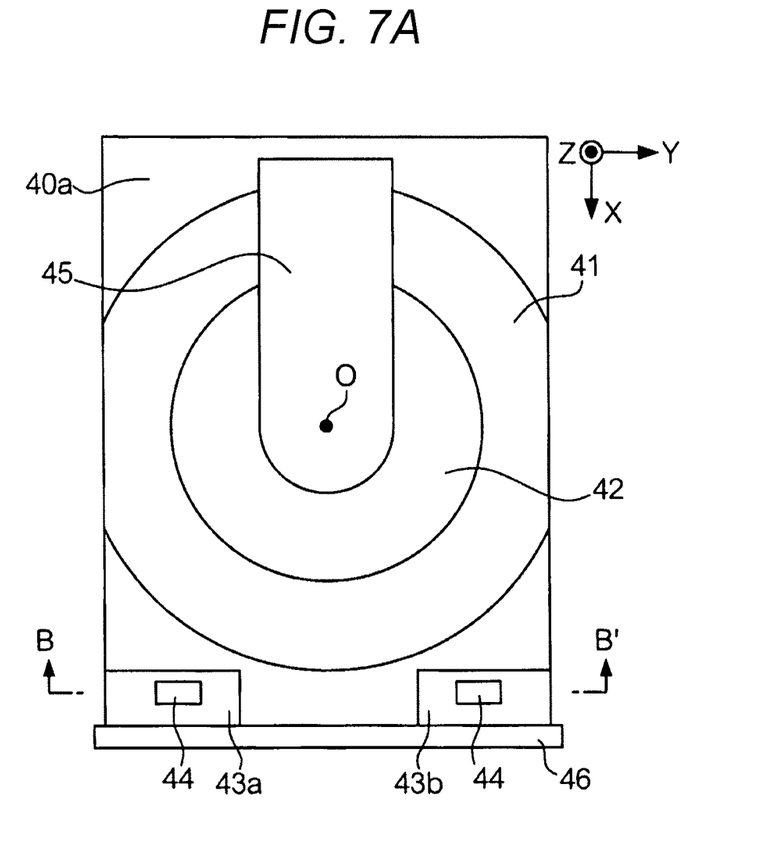
FIGS. 7A and 7B are views showing the structure of a disc tray 40a in a modification.
Figure 7B:
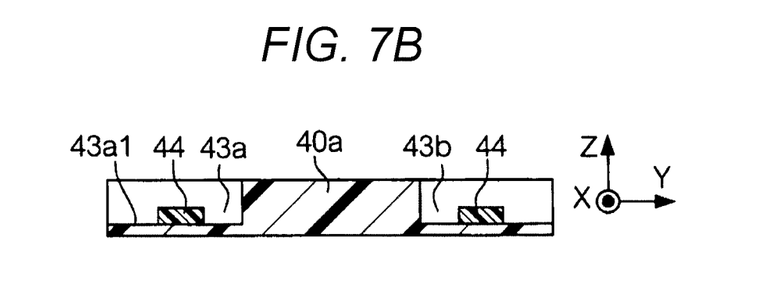

The disc tray 40 which is described in the above embodiment may be modified in the following manner. FIGS. 7A and 7B are views showing the structure of a disc tray 40a in the modification. FIG. 7A is a plan view of the disc tray 40a, and FIG. 7B is a sectional view taken along line B-B' in FIG. 7A. In the disc tray 40a, the recess portions 41, 42 for accommodating the optical disc 5 are configured in the same manner as those in the above-described disc tray 40. Therefore, description of the recess portions is omitted.

A recess portion 43a is a recess in which the portable terminal 6 is to be accommodated. The recess portion 43a is disposed on the rear side of the lid 46 and in the left side of the disc tray 40a. In the recess portion 43a, the connector 44 is disposed so as to be protruded in the upper direction from the bottom surface 43a1 of the recess portion 43a. The portable terminal 6 is set into the recess portion 43a while the female connector is placed at the left side surface of the portable terminal 6 is directed toward the connector 44. When the connector 44 of the recess portion 43a is fitted into the connector of the portable terminal 6 which is set into the recess portion 43a, the portable terminal 6 and the electronic apparatus 3 are electrically connected to each other.

A recess portion 43b which has the same shape as the recess portion 43a, and the connector 44 may be disposed on the bottom face of the rear side of the lid 46 and in the right side of the disc tray 40a. In the case where a plurality of connectors 44 are disposed as described above, the connector 44 of the recess portion 43b may be different in shape and dimension from that of the recess portion 43a.

(2-3) Modification 3

In the above-described embodiment, the disc tray 40 has the structure in which one optical disc is loaded in the case 300. The structure of the disc tray 40 is not limited to this structure. For example, the disc tray 40 may have a configuration where a plurality of optical discs 5 are simultaneously loaded on as in a CD player which is so-called CD changer, or where, during reproduction of the optical disc 5, the portable terminal 6 can be connected by using the technique in which a disc tray can be opened and closed while maintaining the reproduction state of the optical disc (for example, JP-A-8-77675). In this case, the controlling unit 303 can simultaneously perform a process of reading music data recorded on the optical disc 5, and that of storing music data which are converted into a file format that can be processed by the portable terminal 6, in the portable terminal 6.

(2-4) Modification 4

In the above-described embodiment, the portable terminal 6 is a portable music player. The invention is not limited to this, and can be applied to other kinds of electronic apparatuses. For example, the portable terminal 6 may be any one of wide variety of electronic apparatuses, for example, a portable telephone, a wireless LAN (Local Area Network) terminal, a PDA (Personal Digital Assistant), an IC recorder, a portable game machine, a personal computer, and a nonvolatile auxiliary storage apparatus such as an HDD ( )

(2-5) Modification 5

In the above-described embodiment, the connector 44 disposed in the disc tray 40 has a male shape, and the connector disposed in the portable terminal 6 has a female shape. The invention is not limited to this. The connector 44 disposed in the disc tray 40 may have a female shape, and the connector disposed in the portable terminal 6 may have a male shape.

(2-6) Modification 6

In the above-described embodiment, the recess portion 43 is configured so that the longitudinal direction coincides with the right and left directions of the electronic apparatus 3. Alternatively, the longitudinal direction of the recess may coincide with the front and rear directions of the electronic apparatus 3. In the case where the longitudinal direction of the recess portion 43 coincides with the front and rear directions of the electronic apparatus 3, the connector 44 may be placed on the inner wall surface of the recess portion 43 which is on the side of the lid 46, or on the inner wall surface which is opposed to the lid 46.

(2-7) Modification 7

In the above-described embodiment, the controlling unit 303 may detect disconnection of the portable terminal 6 from the connector 44. In this case, the controlling unit 303 may control the tray motor driving circuit 311 so that the disc tray 40 is housed in the case 300.

(2-8) Modification 8

In the above-described embodiment, the height of the lid 46 in the upper and lower directions is larger than that of the portion outside the recess 41. Alternatively, the height of the lid 46 in the upper and lower directions may be equal to that of the portion outside the recess 41. In the configuration, when the disc tray 40 is housed in the case 300, a gap is formed between the opening portion 301 and the disc tray 40. However, the connector 44 is located behind the opening portion 301, and hence the amount of dust reaching the connector 44 is smaller in the case where the connector 44 is disposed on the surface of the case 300.

(2-9) Modification 9

In the above-described embodiment, in a state where the disc tray 40 is projected from the case 300 and the portable terminal 6 is connected to the connector 44, when the button 302 is again pressed within a predetermined time period after the button 302 is pressed, the disc tray 40 may be housed to the position shown in FIG. 5.

In a state where the disc tray 40 is projected from the case 300 and the portable terminal 6 is connected to the connector 44, when the button 302 is continued to be pressed for a predetermined time period or longer, furthermore, the disc tray 40 may be housed to the position shown in FIG. 5.

(2-10) Modification 10

In the above-described embodiment, in the case where, when the disc tray 40 is in the state of FIG. 2, the portable terminal 6 is connected to the connector 44, even when the button 302 is not pressed, the controlling unit 303 may cause the disc tray 40 to be housed to the position shown in FIG. 5.

When the disc tray 40 is moved to the position shown in FIG. 5, the electronic apparatus 3 may access the portable terminal 6 to cause the titles of music data stored in the electronic apparatus 3, to be displayed on the displaying portion 61.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2010-083429 filed on Mar. 31, 2010, the contents of which are incorporated herein by reference.

What is claimed is:

1. An electronic apparatus, consisting of:
   a case;
   a single movable portion that: i) has an optical disc tray that is structurally configured to accommodate an optical disc, ii) has a portable terminal accommodating portion that is structurally configured to accommodate a portable terminal, and iii) is structurally configured to move to an outside of the case and is structurally configured to move to an inside of the case, the portable terminal accommodating portion having a connector that is structurally configured to be connected to the portable terminal; and
   an accessing portion that is structurally configured to access the optical disc accommodated in the optical disc tray, and that is structurally configured to access the portable terminal which is connected to the connector in a state that the portable terminal is accommodated in the portable terminal accommodating portion, wherein
      when the single movable portion is moved to the inside of the case so as to be housed in the case, the connector is located in the case.

2. The electronic apparatus according to claim 1, wherein when the portable terminal is connected to the connector, the single movable portion is moved in a direction toward the inside of the case.

3. The electronic apparatus according to claim 2, wherein when the portable terminal is connected to the connector, the single movable portion is moved to a predetermined position where the portable terminal is located outside the case; and
   wherein when the single movable portion is moved to the predetermined position, the accessing portion accesses the portable terminal.

4. The electronic apparatus according to claim 1, wherein the connector is arranged on the portable terminal accommodating portion of the single movable portion so as to be directed in a connecting direction for connecting the portable terminal; and
   wherein the connecting direction is different from a direction in which the single movable portion is moved to the inside of the case.

5. The electronic apparatus according to claim 1, wherein when the single movable portion is outside of the case and both the optical disc and the portable terminal are disposed on the single movable portion, planes defined by the optical disc and the portable terminal are substantially parallel to one another.

6. The electronic apparatus according to claim 5, wherein at least a portion of the optical disc overlaps the portable terminal.

7. The electronic apparatus according to claim 1, wherein a position of the optical disc tray and a position of the portable terminal accommodating portion with respect to the single movable portion, when the single movable portion is inside of the case, is the same as when the single movable portion is outside of the case.

8. The electronic apparatus according to claim 7, wherein
   the portable terminal is structurally configured to be removed from the single movable portion in a first direction, and the optical disc is structurally configured to be removed from the single movable portion in a second direction, and
   the first direction is substantially orthogonal the second direction.

9. An electronic apparatus, consisting of:
   a case;
   a movable portion that: i) has an optical disc tray that is configured to accommodate an optical disc, ii) has a portable terminal accommodating portion that is configured to accommodate a portable terminal, and iii) is configured to move to an outside of the case and is configured to move to an inside of the case, the portable terminal accommodating portion having a connector that is configured to be connected to the portable terminal; and
   an accessing portion that is configured to access the optical disc accommodated in the optical disc tray, and that is configured to access the portable terminal which is connected to the connector in a state that the portable terminal is accommodated in the portable terminal accommodating portion, wherein
   the optical disc tray and the portable terminal accommodating portion are integrally formed on the movable portion, such that the optical disc tray and the portable terminal accommodating portion are stationary with respect to the movable portion.

10. The electronic apparatus according to claim 1, wherein a portion of the optical disc directly overlaps a portion of the portable terminal.

* * * * *